UNITED STATES PATENT OFFICE.

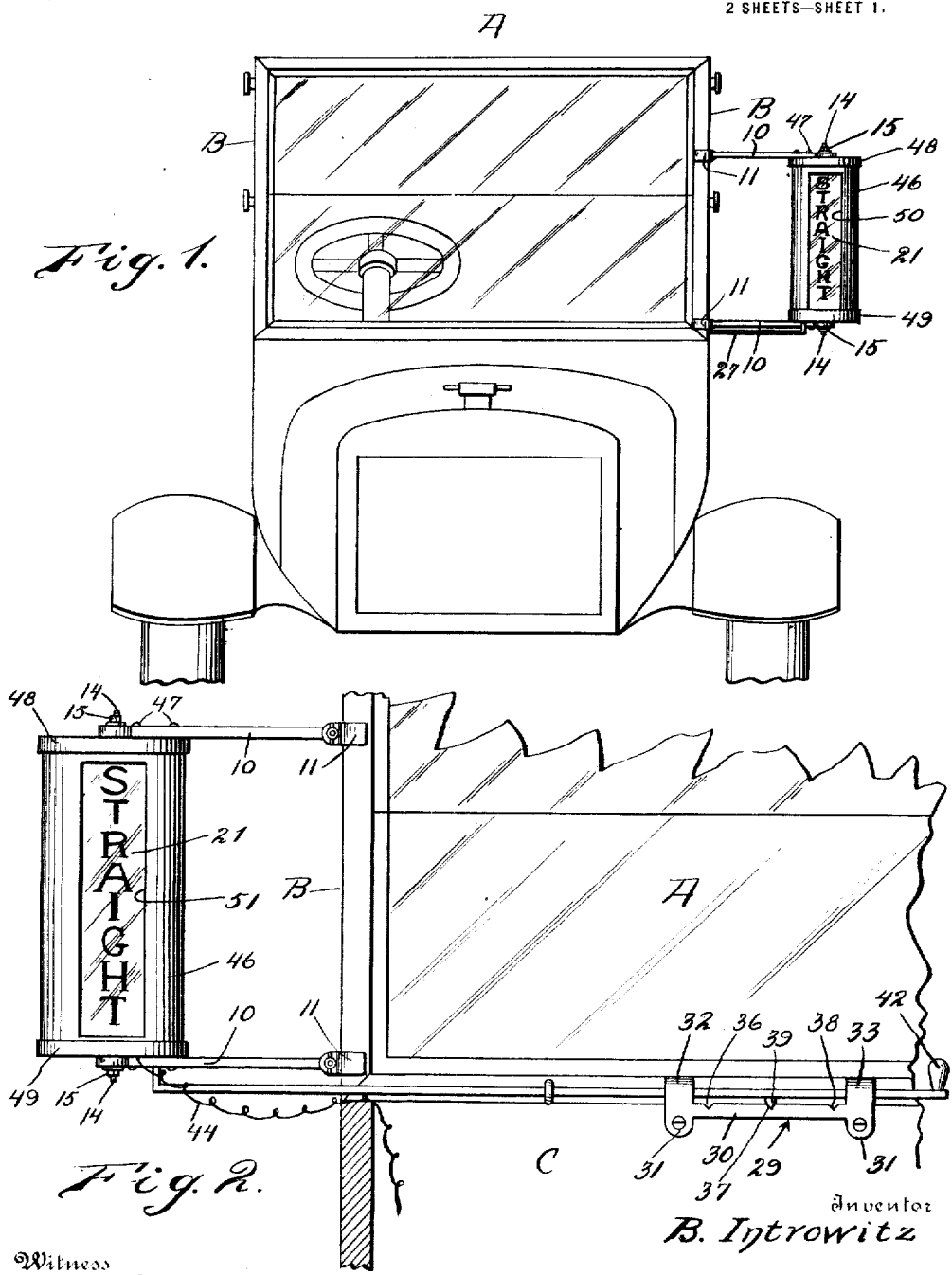

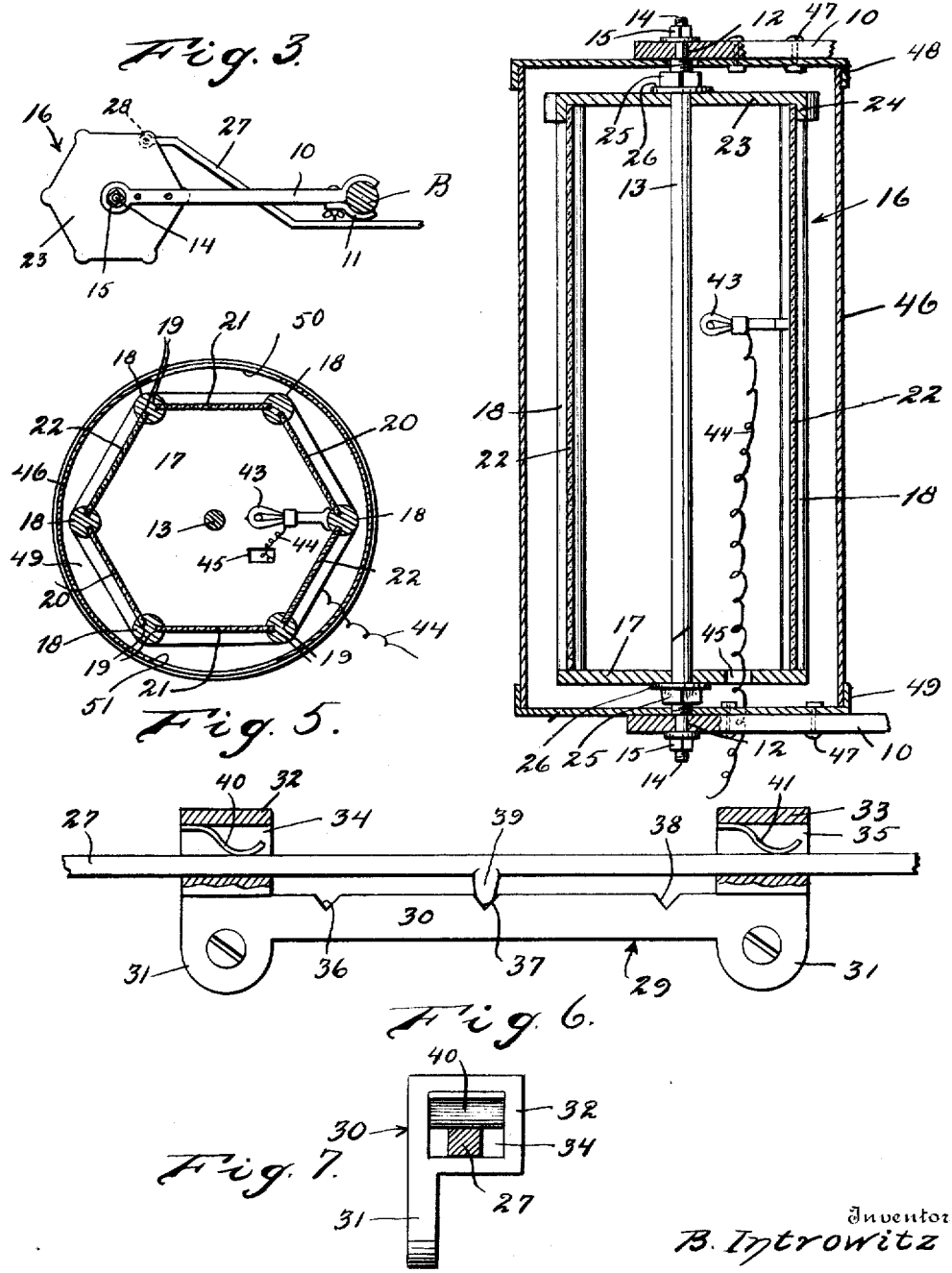

BENJAMIN INTROWITZ, OF CHIPPEWA FALLS, WISCONSIN; ANNA INTROWITZ ADMINISTRATRIX OF SAID BENJAMIN INTROWITZ, DECEASED.

AUTO DIRECTION-SIGNAL.

1,305,901.   Specification of Letters Patent.   Patented June 3, 1919.

Application filed March 29, 1918. Serial No. 225,562.

*To all whom it may concern:*

Be it known that I, BENJAMIN INTROWITZ, a citizen of the United States, residing at Chippewa Falls, in the county of Chippewa and State of Wisconsin, have invented new and useful Improvements in Auto Direction-Signals, of which the following is a specification.

This invention relates to signaling devices, particularly to signaling devices for automobiles, and has for its object the provision of a signaling device secured upon one side of the windshield of an automobile for indicating to preceding and following traffic any intended change in direction of movement of the vehicle.

An important object is the provision of a signal of this character having its indicating member formed of translucent material and bearing indicia identically the same on opposite sides whereby the same signal will be displayed toward the front and to the rear, and provided with internally disposed illuminating means whereby the signal may be readily seen at night.

A further object is the provision of a device of this character having its parts so constructed that they may be readily attached to a windshield and dash of an automobile without making any extensive alterations thereto and the parts of which may be readily disassembled for repairing or replacement.

Another important object is the provision of a guide bracket secured upon the dash for guiding the operating rod in its movement and provided with means for holding the signal in any desired position so that it will not be moved accidentally on account of any jars or shocks.

With these and other objects in view such as comparative simplicity and cheapness, efficiency in service, durability in use and a general improvement of the art, the invention consists in the novel construction and arrangement of parts to be hereinafter more fully described and claimed as illustrated in the accompanying drawing in which:—

Figure 1 is a front elevation of an automobile equipped with my signal device.

Fig. 2 is a cross sectional view through the forward portion of the automobile body looking toward the windshield and showing my device in elevation from the opposite side.

Fig. 3 is a horizontal sectional view through one side bar of the windshield showing my device in plan with the casing removed.

Fig. 4 is a vertical sectional view through the signal itself, and showing the casing.

Fig. 5 is a detail horizontal sectional view therethrough.

Fig. 6 is a detail view of the guide bracket for the operating rod and,

Fig. 7 is a detail cross sectional view therethrough.

Referring more particularly to the drawing the letter A indicates the windshield of an automobile having the usual upright side bars B and mounted upon the dash C. In carrying out my invention I provide a pair of spaced horizontally extending rods 10 having their inner ends provided with suitable clamps 11 engaging upon the side bar B of the windshield and having their outer ends provided with openings 12 disposed in vertical alinement. A vertical rod 13 is disposed between the rods 10 and has reduced ends 14 extending through the holes 12. Nuts 15 are threaded upon the reduced ends 14 for preventing accidental displacement of the rod or shaft 13 with relation to the rods 10.

My signal member comprises a hexagonal shaped body indicated broadly by the numeral 16. This body comprises a lower head 17 hexagonal in form and having secured thereto at its corners upwardly extending bars 18 each of which is provided with a pair of longitudinally extending grooves 19 in which are slidably mounted oppositely disposed plates 20, 21 and 22 formed preferably of glass. The top of this body is closed by a hexagonal head 23 having depending flanges 24 bearing against the outer sides of the glass plates or panels. This body is disposed upon the shaft 13 and is held in position thereon by means of nuts 25 threaded upon the ends of the enlarged portions of the shaft and bearing against washers 26 engaging the heads 17 and 23. The plates are of translucent white glass and the different pairs 20, 21 and 22 have inscribed thereon preferably in red letters the legend "Left," "Straight" and "Right" respectively.

By the above described construction of the signal body 16 it will be noted that in case any one of the glass plates or panels becomes broken it may be removed and replaced by removing the body from between the rods 10 and then removing the upper head 23, whereupon the broken panel may be slid out of the grooves 19. Under ordinary conditions, the plate or head 23 is held in clamped relation to the bars 18 and glass panels and consequently prevents any looseness or rattling of the panels.

In order that the signal body 16 may be turned to indicate an intended change in direction so that the desired legend will be exposed toward the front and back of the automobile, I provide a rod 27 pivotally secured as at 28 upon one corner of the lower head 17 and having its other end disposed upon the dash of the automobile and operable through a novel guide bracket 29. This guide bracket 29 comprises a plate 30 having attaching ears 31 thereon whereby it may be secured upon the dash, and further comprises integrally formed upstanding lugs 32 and 33 provided with openings 34 and 35 for the passage of the rod 27. The upper face of the plate 30 is provided with a plurality of notches 36, 37 and 38 engageable selectively by a depending lug 39 on the lower face of the rod 27 whereby the signal body may be held in any desired position. In order that the depending lug 39 may be held firmly within any one of the notches, I provide leaf springs 40 and 41 in the openings 34 and 35 respectively and bearing upon the upper face of the rod 27 for urging the rod 27 resiliently downward.

In the operation of the device, when it is desired to indicate an intended turn to the left, it is merely necessary to grasp the knob 42 and move the rod 27 to the left until the lug 39 engages within the notch 36, whereupon the signal body 26 will be rotated partially until the plate 20 bearing the legend "Left" will face toward the front and rear of the automobile. If no change in direction is intended, the rod 27 is moved so that the lug 39 is disposed within the notch 37 whereupon the plates bearing the legend "Straight" will be disposed toward the front and rear of the automobile. If it is desired to turn to the right, the rod 27 is moved so that the lug 39 will engage within the notch 38 whereupon the plate bearing the legend "Right" will be made visible from the front and back of the automobile in a similar manner.

In order to prevent any possible binding of the rod 27 within the guide bracket 29 when the rod is being swung during its lengthwise movement, I form an opening 34 of greater width than the width of the rod 27 so that the rod 27 may have lateral play therein as clearly shown in Fig. 7.

In order that the device may be conveniently used at night, I provide an electric light bulb 43 disposed within the signal body 16 and connected by a wire 44 with whatever source of current is provided upon the vehicle. It is understood of course that the lower head 17 is provided with an opening 45 for the passage of the wire 44. Any suitable switch, not shown, may be provided for cutting off the current when desired.

In order to prevent any but the desired legends from being visible, I provide a cylindrical casing 46 entirely surrounding the signal and secured to the bracket arms 10 by screws 47 or the like. The casing 42 has its heads 48 and 49 detachable from the sides to permit access to the rotary signal member, and has its cylindrical sides provided with alined openings 50 and 51 facing toward the front and rear of the vehicle respectively so that the proper legend may be visible therethrough. The bottom head 49 is of course provided with suitable openings for the passage of the wire 44 and the rod 27.

From the foregoing description and a study of the drawing it will be apparent that I have thus provided a signaling device for automobiles which may be easily operated and which will effectively display to preceding and following traffic any intended change in direction of travel of the vehicle upon which the signal is mounted.

It will be understood that I reserve the right to make such changes in the form, construction and arrangement of parts as will not depart from the spirit of the invention nor the scope of the subjoined claim.

Having thus described my invention, I claim:—

In an automobile signaling device comprising a revoluble casing bearing indicia, means for rotating said casing to the desired degree, comprising a rod connected with said casing, a guide bracket comprising a plate, upstanding lugs on said plate provided with openings for the passage of said rod, a lug on the lower side of said rod engageable selectively within notches in the upper side of said plate, and springs disposed within the openings in said lug and bearing upon said rod for resiliently holding said lug in engagement with said notches.

In testimony whereof I affix my signature.

BENJAMIN INTROWITZ.